J. J. PAVLIK, Jr.
SAFETY KEY RING HOOK.
APPLICATION FILED JAN. 21, 1921.
1,377,724.
Patented May 10, 1921.
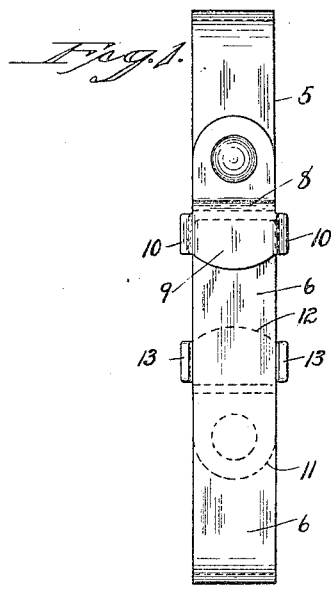
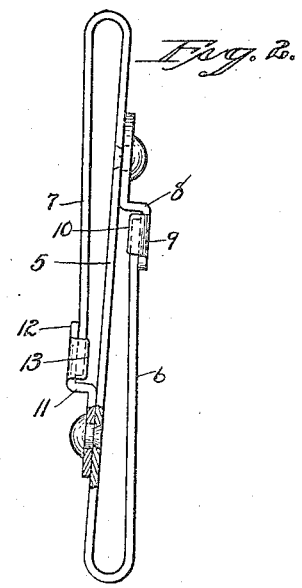
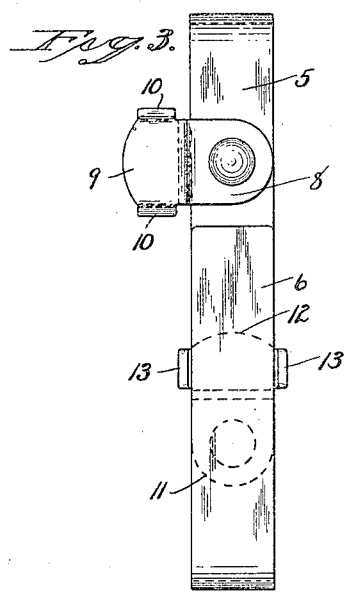
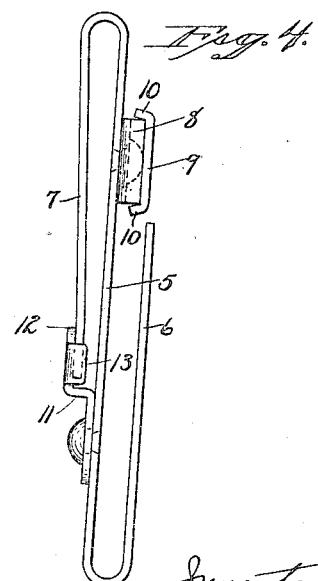

UNITED STATES PATENT OFFICE.

JOHN JOSEPH PAVLIK, JR., OF NEW HAVEN, CONNECTICUT.

SAFETY KEY-RING HOOK.

1,377,724. Specification of Letters Patent. Patented May 10, 1921.

Application filed January 21, 1921. Serial No. 439,013.

*To all whom it may concern:*

Be it known that I, JOHN J. PAVLIK, Jr., a citizen of the United States, residing at New Haven, in the county of New Haven and State of Connecticut, have invented a new and useful Improvement in Safety Key-Ring Hooks; and I do hereby declare the following, when taken in connection with the accompanying drawings and the characters of reference marked thereon, to be a full, clear, and exact description of the same, and which said drawings constitute part of this application, and represent, in—

Figure 1 a face view of a safety key ring hook constructed in accordance with my invention.

Fig. 2 a side view partly in section of the same.

Fig. 3 a face view with one of the latches disengaged from its hook.

Fig. 4 a side view of the same.

This invention relates to an improvement in safety key ring hooks, and particularly to that class which are formed from a single strip of metal reversely turned at opposite ends to form two hooks, one to engage with a belt and the other to receive a key ring. In hooks of this character it is desirable to provide some means to prevent the disengagement of the hook from the belt, and also to prevent the disengagement of the key ring, and the object of this invention is to provide simple means for accomplishing these purposes, and the invention consists in the construction and arrangement of parts as hereinafter described and particularly recited in the claim.

In carrying out my invention I employ a hook like those commonly constructed, consisting of a one-piece strip of spring material, comprising a medial portion 5 formed at one end with an upturned key ring hook 6 and at the opposite end with a belt hook 7. Pivoted to the medial portion 5, beyond the end of the hook 6, is a latch 8, having an offset arm 9 adapted to extend over the nose of the hook 6, and preferably this arm 9 is formed on opposite sides with fingers 10 to extend over the edges of the nose of the hook 6, so as to securely close that hook. Secured to the opposite side of the medial portion 5 and beyond the nose of the hook 7 is a similar latch 11, having an arm 12 and fingers 13, adapted to close the end of the hook 7. By depressing the ends of the hooks the latches may be freely turned so as to open the hooks to permit the belt hook to engage with a belt or a key ring to be passed over the key ring hook 6, and when the latches are turned in line with the hooks, the ends of the hooks spring outward between the fingers, and the latches are thus held against turning and the hooks are securely closed.

I claim:

A safety key ring hook comprising a strip of metal including a medial portion and hooks at the opposite ends thereof, latches pivotally secured to opposite faces of the medial portions at points beyond the ends of the hooks and adapted to be turned into or out of engagement therewith, the said latches formed on opposite sides with inwardly projecting fingers adapted to set over the sides of the ends of the hooks, whereby the latches are prevented from rotating and disengaging from the hooks.

In testimony whereof, I have signed this specification in the presence of two subscribing witnesses.

JOHN JOSEPH PAVLIK, JR.

Witnesses:
FREDERIC C. EARLE,
MALCOLM P. NICHOLS.